(12) United States Patent
Taylor et al.

(10) Patent No.: US 11,438,364 B2
(45) Date of Patent: Sep. 6, 2022

(54) THREAT ANALYSIS FOR INFORMATION SECURITY

(71) Applicant: Bank of America Corporation, Charlotte, NC (US)

(72) Inventors: Jo-Ann Taylor, Godalming (GB); Amelia B. Hartman, Huntersville, NC (US); Simon Neil Riggs, Hampton (GB)

(73) Assignee: Bank of America Corporation, Charlotte, NC (US)

(*) Notice: Subject to any disclaimer, the term of this patent is extended or adjusted under 35 U.S.C. 154(b) by 216 days.

(21) Appl. No.: 16/862,927

(22) Filed: Apr. 30, 2020

(65) Prior Publication Data
US 2021/0344702 A1 Nov. 4, 2021

(51) Int. Cl.
*H04L 29/00* (2006.01)
*H04L 9/40* (2022.01)

(52) U.S. Cl.
CPC ...... *H04L 63/1433* (2013.01); *H04L 63/0428* (2013.01)

(58) Field of Classification Search
CPC .............. G06F 21/577; H04L 63/0428; H04L 63/1433; H04L 63/107; H04L 63/105; H04L 67/1097
See application file for complete search history.

(56) References Cited

U.S. PATENT DOCUMENTS

| | | |
|---|---|---|
| 4,853,851 A | 8/1989 | Horsch |
| 5,161,158 A | 11/1992 | Chakravarty et al. |
| 5,321,242 A | 6/1994 | Heath, Jr. |
| 5,533,125 A | 7/1996 | Bensimon et al. |
| 5,586,252 A | 12/1996 | Barnard et al. |
| 5,623,637 A | 4/1997 | Jones et al. |
| 5,712,912 A | 1/1998 | Tomko et al. |
| 5,748,744 A | 5/1998 | Levy et al. |
| 5,845,066 A | 12/1998 | Fukuzumi |
| 6,363,488 B1 * | 3/2002 | Ginter ............... G06F 21/6209 375/E7.009 |
| 6,532,552 B1 | 3/2003 | Benignus et al. |
| 6,581,161 B1 | 6/2003 | Byford |
| 6,751,733 B1 | 6/2004 | Nakamura et al. |
| 6,823,478 B1 | 11/2004 | Prologo et al. |
| 6,892,301 B1 | 5/2005 | Hansmann et al. |
| 6,895,577 B1 | 5/2005 | Noble et al. |
| 7,035,766 B1 | 4/2006 | Farel et al. |

(Continued)

OTHER PUBLICATIONS

Taylor, J. et al., "Security Control Management for Information Security," U.S. Appl. No. 16/862,795, filed Apr. 30, 2020, 33 pages.

*Primary Examiner* — Don G Zhao

(57) ABSTRACT

A device configured to receive a data storage request that identifies a target data storage device for a data element. The device is further configured to determine a security level associated with the target data storage device. The device is further configured to determine a protection level range based on the determined security level and to identify one or more security controls within the protection level range. Each security control comprises a hardware configuration for data storage devices that are associated with mitigating one or more vulnerability types. The device is further configured to output the identified one or more security controls.

14 Claims, 4 Drawing Sheets

(56) References Cited

U.S. PATENT DOCUMENTS

| | | |
|---|---|---|
| 7,039,644 B2 | 5/2006 | Hind et al. |
| 7,069,447 B1 | 6/2006 | Corder |
| 7,197,427 B2 | 3/2007 | Noonan et al. |
| 7,246,092 B1* | 7/2007 | Peterson ............... G06Q 40/04 |
| | | 705/40 |
| 7,600,130 B2 | 10/2009 | Ooi et al. |
| 7,882,369 B1 | 2/2011 | Kelleher et al. |
| 8,627,287 B2 | 1/2014 | Fanning et al. |
| 8,650,611 B2* | 2/2014 | Heo ..................... G06F 21/608 |
| | | 713/182 |
| 8,988,187 B2 | 3/2015 | Wong et al. |
| 9,262,611 B2 | 2/2016 | Johnson et al. |
| 9,319,221 B1* | 4/2016 | Awad ................... H04L 9/3231 |
| 9,349,111 B1 | 5/2016 | Elgarat |
| 9,754,255 B1* | 9/2017 | Ma ..................... G06Q 20/4014 |
| 9,921,952 B2 | 3/2018 | Dean et al. |
| 10,037,261 B2 | 7/2018 | Jhoney et al. |
| 10,248,891 B2 | 4/2019 | Foley et al. |
| 10,496,840 B1* | 12/2019 | Mehr ................... G06F 16/345 |
| 10,498,767 B1* | 12/2019 | Khetawat ........... H04L 65/1083 |
| 10,516,679 B2* | 12/2019 | Karnik ................. H04L 67/02 |
| 10,593,380 B1* | 3/2020 | Volpe ................... G06F 17/18 |
| 10,904,277 B1* | 1/2021 | Sharifi Mehr ...... H04L 63/1425 |
| 11,321,006 B1* | 5/2022 | Grunwald ............. G06F 3/0619 |
| 2003/0236979 A1* | 12/2003 | Himmel ................. H04L 63/08 |
| | | 713/167 |
| 2004/0015331 A1 | 1/2004 | Klotz et al. |
| 2004/0040014 A1 | 2/2004 | Ball |
| 2004/0044897 A1 | 3/2004 | Lim |
| 2004/0054790 A1* | 3/2004 | Himmel ............. G06F 21/6209 |
| | | 726/21 |
| 2004/0107415 A1 | 6/2004 | Melamed et al. |
| 2005/0015675 A1 | 1/2005 | Kolawa et al. |
| 2005/0114689 A1 | 5/2005 | Strom et al. |
| 2005/0223361 A1 | 10/2005 | Belbute |
| 2006/0070123 A1* | 3/2006 | Camilli ................. G06F 21/85 |
| | | 726/16 |
| 2006/0155498 A1 | 7/2006 | Dunsmore et al. |
| 2006/0218639 A1* | 9/2006 | Newman ................. G06F 21/10 |
| | | 726/25 |
| 2007/0192601 A1 | 8/2007 | Spain et al. |
| 2007/0239994 A1 | 10/2007 | Kulkarni et al. |
| 2007/0255962 A1 | 11/2007 | Lu et al. |
| 2008/0098237 A1* | 4/2008 | Dung ................. H04L 63/0428 |
| | | 726/30 |
| 2008/0267404 A1 | 10/2008 | Budde et al. |
| 2008/0282235 A1 | 11/2008 | Jadhav et al. |
| 2009/0097719 A1 | 4/2009 | Lim |
| 2009/0138306 A1 | 5/2009 | Coburn et al. |
| 2009/0282292 A1 | 11/2009 | Squire |
| 2010/0185675 A1* | 7/2010 | Song ................... H04L 63/0227 |
| | | 707/783 |
| 2010/0191952 A1 | 7/2010 | Keinan |
| 2011/0246766 A1* | 10/2011 | Orsini ................. G06F 11/1076 |
| | | 713/160 |
| 2012/0254710 A1 | 10/2012 | Flanagan et al. |
| 2015/0019564 A1 | 1/2015 | Higginson et al. |
| 2015/0039386 A1 | 2/2015 | Kymal et al. |
| 2015/0106873 A1* | 4/2015 | Marsh ................. G06Q 10/0635 |
| | | 726/1 |
| 2015/0309918 A1 | 10/2015 | Raghavan et al. |
| 2015/0319185 A1* | 11/2015 | Kirti ..................... H04L 67/306 |
| | | 726/23 |
| 2016/0259946 A1* | 9/2016 | Mardikar ............... H04L 63/20 |
| 2017/0295199 A1* | 10/2017 | Kirti ................... H04L 63/1425 |
| 2018/0124114 A1* | 5/2018 | Woods ................ G06F 21/577 |
| 2018/0357581 A1 | 12/2018 | Sharma et al. |
| 2018/0375886 A1* | 12/2018 | Kirti ..................... H04L 63/102 |
| 2019/0052664 A1* | 2/2019 | Kibler ................... G06F 11/301 |
| 2019/0095320 A1* | 3/2019 | Biswas ................ G06F 21/577 |
| 2019/0318100 A1* | 10/2019 | Bhatia ................ H04L 63/1425 |
| 2020/0053117 A1* | 2/2020 | Mandal ............... H04L 63/1433 |
| 2020/0250317 A1* | 8/2020 | Gourisetti ............ G06F 21/577 |
| 2020/0356678 A1* | 11/2020 | Gourisetti ............ G06F 21/577 |
| 2021/0026968 A1* | 1/2021 | Sanow ................. G06F 21/577 |
| 2021/0120014 A1* | 4/2021 | Argoety ................. H04L 63/20 |
| 2021/0234885 A1* | 7/2021 | Campbell ........... H04L 63/1466 |
| 2021/0385129 A1* | 12/2021 | Shadbolt ............... H04L 63/205 |

* cited by examiner

THREAT ANALYSIS FOR INFORMATION SECURITY

TECHNICAL FIELD

The present disclosure relates generally to information security, and more specifically to a threat analysis for information security.

BACKGROUND

In a network environment, network devices are in data communication with other network devices that may be distributed anywhere in the world. These network environments allow data (e.g. files) to be shared and stored among different network devices. One of the technical challenges that occur when data is stored in network devices is controlling data leakage, unauthorized access to data, and preventing malicious activities. Data storing devices, such as databases and file repositories, are vulnerable to online attacks and physical attacks. This vulnerability poses several network security challenges. In conventional computer systems, if a device becomes compromised (e.g. hacked) by a malicious actor, the device can be exploited to exfiltrate data or to perform other malicious activities.

SUMMARY

The system disclosed in the present application provides a technical solution to the technical problems discussed above by monitoring and adjusting security controls for a data storage device. The disclosed system provides several practical applications and technical advantages which include a process for determining a current level of information security that is provided by a data storage device and then applying one or more security controls to increase the level of information security of the data storage device before storing data. This process improves the computer system's ability to securely store data and provides improved information security. The disclosed system provides a process for determining the types of attacks a data storage device is vulnerable to and then increasing the information security level of the data storage device by applying one or more security controls. This process improves the operation of the computer network by automatically determining which security controls can be applied to a data storage device to increase the level of information security that is provided by the data storage device. This process mitigates the data storage device's vulnerability to different types of attacks.

In one embodiment, the computer system comprises an information security device that is configured to a data storage request that includes information about a target data storage device for storing a data element (e.g. an encryption key). The information security device uses the information in the data storage request to determine whether the target data storage device is a preapproved device. When the target data storage device is an approved device, this means that the target data storage device is already configured to provide a sufficient level of security for storing the data element. This also means that the information security device can store the data element in the target data storage device without having to apply any additional security controls. When the target data storage device is not approved device, this means that the information security device is configured to determine what types of attacks or vulnerabilities the target data storage device is susceptible to and to identify one or more security controls that can be applied to the target data storage device to mitigate effects of an attack. A security control may comprise software and/or hardware configurations for the target data storage device. The information security device is further configured to apply one or more of the identified security controls to improve the information security level of the target data storage device before storing the data element in the target data storage device. This process improves the operation of the computer system by increasing the information security level of the target data storage device before storing sensitive data in the target data storage device.

In another embodiment, the information security device is configured to receive a data storage request that includes information about a target data storage device for storing a data element. The information security device is further configured to determine an information security level for the target data storage device based on security features that are provided by the target data storage device. The information security device is further configured to identify a range of security controls that can be applied to the target data storage device and to apply one or more of the identified security controls to the target data storage device. This process improves the operation of the computer system by identifying software and/or hardware configurations that can be applied to the target data storage and applying the identified configurations to increase the information security level for the target data storage device.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

System Overview

Figure 1:
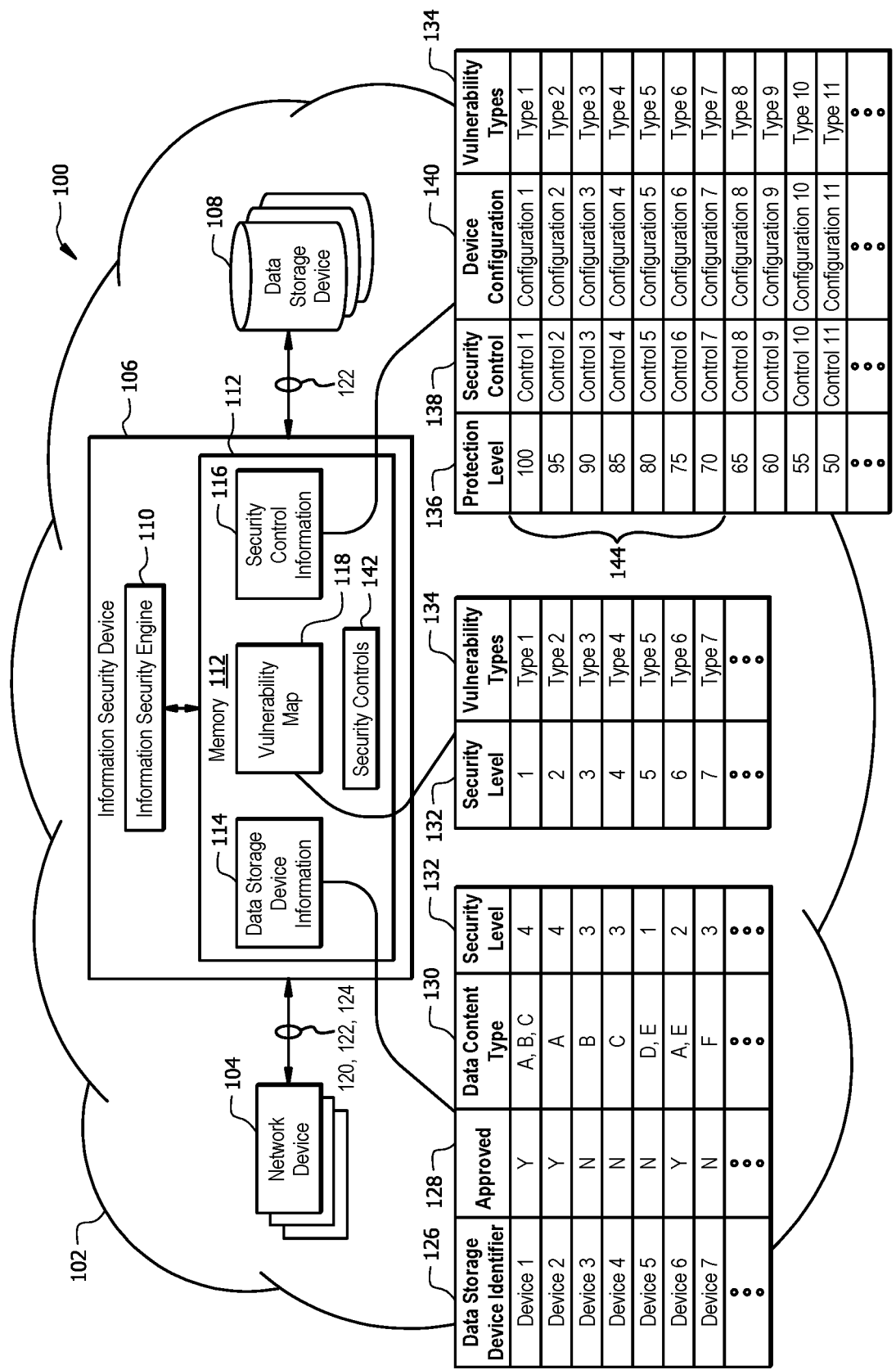
FIG. 1 is a schematic diagram of an information security system configured to securely store data by adjusting security controls for data storage devices.

FIG. 1 is a schematic diagram of an information security system 100 configured to securely store data by adjusting security controls 142 for data storage devices 108. In one embodiment, the system 100 comprises an information security device 106 that is in signal communication with one or more other network devices 104 and one or more data storage devices 108 in a network 102. The system 100 may be configured as shown or in any other suitable configuration.

The network 102 may be any suitable type of wireless and/or wired network including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network 102 may be configured to support any suitable type of communication protocol as would be appreciated by one of ordinary skill in the art.

Data Storage Devices

Data storage devices 108 are generally configured to store data. Examples of data storage devices 108 include, but are not limited to, hardware security modules (HSMs), databases, repositories, data stores, servers, network-attached storage (NAS) devices, computing devices, shared folders, or any other suitable type of network device. Data storage devices 108 are in signal communication with the information security device 106 using a network connection. The data storage device 108 may be a local database or a remote database. As an example, the data storage device 108 may be a network device that is managed by the same enterprise that manages the information security device 106. As another example, the data storage device 108 may be a network device that is managed by a third-party that is different from the enterprise that manages the information security device 106.

Information Security Device

The information security device 106 comprises a memory 112 that is configured to store data storage device information 114, security control information 116, vulnerability maps 118, security controls 142, and/or any other suitable type of data. Additional information about the hardware configuration of the information security device 106 is described in FIG. 4.

A security control 142 comprises software and/or hardware settings or configurations for mitigating the effects of different types of attacks and vulnerabilities on a data storage device 108. For example, a security control 142 may comprise port configurations, network configurations, authentication protocol instructions, encryption protocol instructions, communication protocol instructions, tamper protection instructions, or any other suitable type of software or hardware settings or configurations.

The data storage device information 114 generally comprises information associated with data storage devices 108. For example, for each data storage device 108, the data storage device information 114 may comprise a data storage device identifier 126, an approval indicator 128, a data content type identifier 130, a security level 132, location information (e.g. an address or Global Position System (GPS) coordinates), information about available security features, and/or any other suitable type of information associated with a data storage device 108. Data storage device identifiers 126 are configured to uniquely identify a data storage device. For example, a data storage device identifier 126 may comprise a name, a media access control (MAC) address, an Internet Protocol (IP) address, and/or any suitable type of identifier that uniquely identifies a data storage device 108. Approval indicators 128 indicate whether a data storage device 108 has been approved to store a particular type of data element 122. Approval indicators 128 may comprise a Boolean value (e.g. a logical one or a logical zero), an alphanumeric value (e.g. a 'Y' or an 'N'), or any other suitable type of value that indicates whether a data storage device 108 has been approved to store a particular type of data element 122. Data content type identifiers 130 are configured to identify data content types that a data storage device 108 can store. Data content types include, but are not limited to, encryption keys, confidential information, account information, documents, text files, images, audio files, video files, or any other suitable type of data. A security level 132 identifies a level of protection that can be provided by a data storage device 108. A higher security level 132 indicates a higher level of protection provided by a data storage device 108. As an example, security levels 132 may correspond with Federal Information Processing Standards (FIPS) levels. In other examples, security levels 132 may correspond with any other suitable type of information protection level.

The security control information 116 generally comprises information associated with security controls 142 that can be implemented on a data storage device 108 to improve the information security of the data storage device 108. For example, for each security control 142, security control information 116 may comprise a protection level 136, a security control identifier 138, a device configuration 140, a vulnerability type 134, and/or any other suitable type of information associated with security controls 142. A protection level 136 identifies a level of protection that is provided by a security control 142. A higher protection level 136 indicates that a security control 142 is more robust and/or protects against more types of attacks. Security control identifiers 138 are configured to uniquely identify a security control 142. A security control identifier 138 may comprise a name or any other suitable type of identifier that uniquely identifies a security control 142. Device configurations 140 comprise software and/or hardware configurations that can be applied to data storage device 108 to increase the security level 132 of the data storage device 108. For example, a device configuration 140 may comprise port configurations, network configurations, authentication protocol instructions, encryption protocol instructions, communication protocol instructions, tamper protection instructions, or any other suitable type of software or hardware settings for a data storage device 108. Vulnerability types 134 identifies types of attacks that can be performed on a data storage device 108. Examples of vulnerability types 134 include, but are not limited to, data exfiltration, malware, SQL injection, spoofing, privilege abuse, network sniffing, denial of service, ransomware, physical theft, physical damage, environmental damage (e.g. fires, floods, or natural disaster), unauthorized access, data errors, or any other type of attack. In the security control information 116, the vulnerability type 134 corresponds with attacks that a security control 142 is able to mitigate or defend against.

A vulnerability map 118 generally comprises information about types of attacks a data storage device 108 is susceptible to based on the security level 132 of the data storage device 108. The information security engine 110 may be configured to use a vulnerability map 118 with the security control information 116 to identify security controls 142 for a data storage device 108 based on the vulnerability types 134 that are associated with the data storage device 108. As an example, a vulnerability map 118 may comprise a mapping between security levels 132 and vulnerability types 134. In this example, a vulnerability map 118 may comprise a plurality of vulnerability types 134 that are mapped to different security levels 132. In the vulnerability map 118, the vulnerability type 134 corresponds with types of attacks a data storage device 108 is susceptible to based on its security level 132.

Information Security Engine

The information security device 106 further comprises an information security engine 110 that is generally configured to monitor and adjust security controls 142 for data storage devices 108. Examples of the information security engine 110 in operation are described below in FIGS. 2 and 3. In one embodiment, the information security device 106 is configured to receive a data storage request 120 for storing a data element 122 from a network device 104. Examples of data elements 122 include, but are not limited to, encryption keys, account information, documents, text files, images, audio files, video files, or any other suitable type of data. Examples of network devices 104 include, but are not limited to, computers, laptops, mobile devices (e.g. smartphones or tablets), servers, clients, or any other suitable type of device. The data storage request 120 comprises context information 124 that provides information about storing a data element 122. The context information 124 may comprise a data content type identifier 130 for a data element 122, a target data storage device 108 for storing a data element 122, and/or any other suitable type of information associated with storing a data element 122.

The information security engine 110 is configured to use context information 124 to determine whether the target storage device 108 is an approved data storage device 108 for storing a data element 122. For example, the information security engine 110 may compare the context information 124 to the data storage device information 114 to determine whether the target storage device 108 is an approved data storage device 108. When the target data storage device 108 is an approved data storage device 108, the information security engine 110 may store the data element 122 in the target data storage device 108 without requiring any additional security controls 142. When the target data storage device 108 is not an approved data storage device 108, the information security engine 110 is further configured to identify one or more security controls 142 that can be applied to the target data storage device 108 to improve the information security level 132 of the target data storage device 108 before storing the data element 122. The information security engine 110 may determine which security controls 142 can be applied using the security control information 116 and the vulnerability map 118.

Secure Data Storing Process Based on Vulnerability Types

Figure 2:
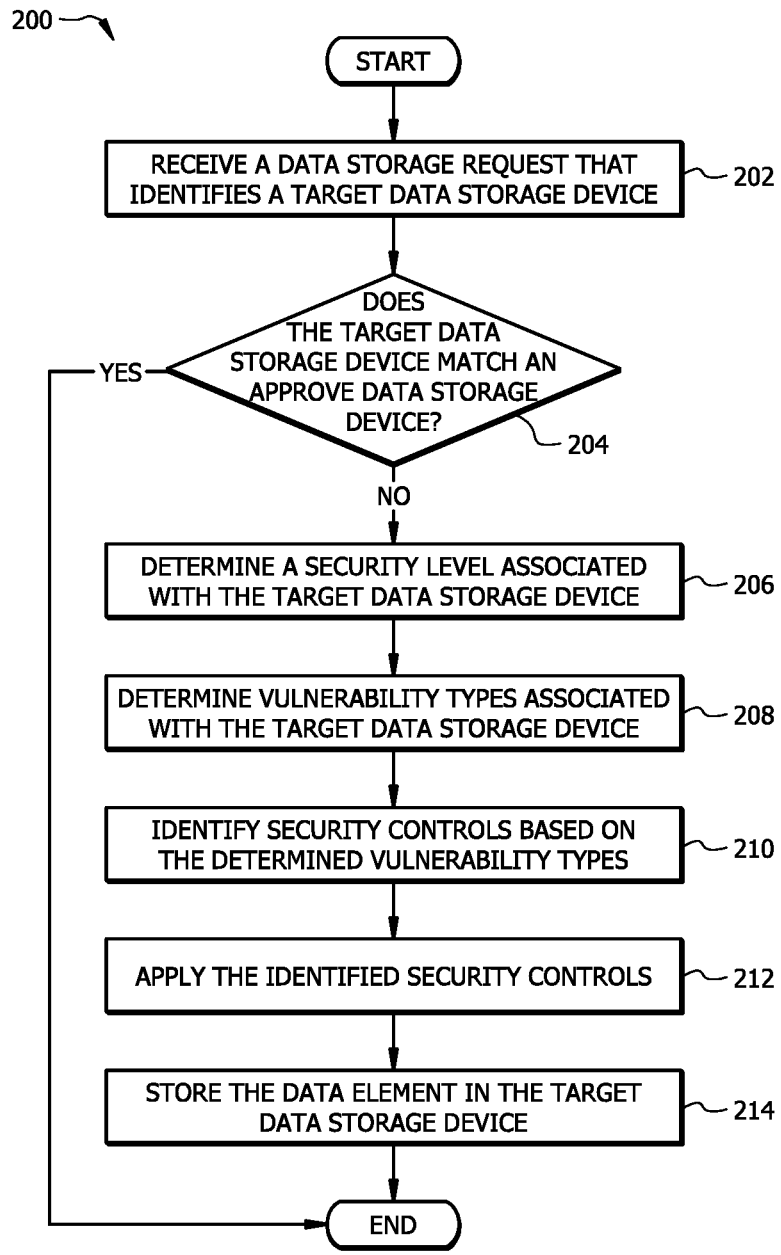
FIG. 2 is a flowchart of an embodiment of a data storing method based on vulnerability types.

FIG. 2 is a flowchart of an embodiment of a data storing method 200 based on vulnerability types 134 that are associated with a target data storage device 108. The information security device 106 may employ method 200 to determine whether a target data storage device 108 is configured to provide sufficient information security. In the event that the target data storage device 108 does not provide a sufficient level of information security, the information security device 106 employs method 200 to identify and apply one or more security controls 142 to increase the information security level of the target data storage device 108.

At step 202, the information security engine 110 receives a data storage request 120 that identifies a target data storage device 108 for storing a data element 122. As an example, the data storage request 120 may comprise context information 124 that identifies a data content type identifier 130 for a data element 122 (e.g. an encryption key) and a data storage device identifier 126 for a target data storage device 108. In other examples, the data storage request 120 may comprise the data element 122 and/or any other suitable type of data or information.

At step 204, the information security engine 110 determines whether the target data storage device 108 matches an approved data storage device 108. Here, the information security engine 110 uses the data storage device information 114 to determine whether the target data storage device 108 matches any approved data storage devices 108. For example, the information security engine 110 uses the data content type identifier 130 for the data element 122 to identify data storage device identifiers 126 for data storage devices 108 that match the data content type 130 of the data element 122. As an example, the data content type identifier 130 may indicate that the data element 122 is an encryption key. The information security engine 110 may identify data storage devices 108 within the data storage device information 114 that are suitable for storing encryption keys by identifying data storage devices 108 that are associated with the same data content type 130.

The information security engine 110 then compares the data storage device identifier 126 for the target data storage device 108 to determine whether the target data storage device 108 matches any of the identified data storage devices 108. If there is not a matching entry in the data storage device information 114, the information security engine 110 determines that the target data storage device 108 is not a preapproved data storage device 108 for storing the data element 122. If there is a matching entry in the data storage device information 114, the information security engine 110 then uses the approval indicator 128 for the entry to determine whether the target data storage device 108 is an approved device.

The information security engine 110 proceeds to step 214 in response to determining that the target data storage device 108 matches an approved data storage device 108. In this case, the information security engine 110 determines that target data storage device 108 is an approved data storage device 108 for storing the data element 122. This means that the information security engine 110 can safely store the data element 122 in the target data storage device 108 without having to apply any additional security controls 142.

Otherwise, the information security engine 110 proceeds to step 206 in response to determining that the target data storage device 108 does not match an approved data storage device 108. In this case, the information security engine 110 determines that the target data storage device 108 is not a preapproved data storage device 108 for storing the data element 122. This means that the information security engine 110 will need to identify one or more security controls 142 to apply to the target data storage device 108 before storing the data element 122 in the target data storage device 108.

At step 206, the information security engine 110 determines a security level 132 that is associated with the target data storage device 108 based on security features that are associated with the target data storage device 108. The security level 132 of the target data storage device 108 is proportional to the number and/or the robustness of the security features provided by the target data storage device 108. In other words, the information security engine 110 associates a higher security level 132 to more secure data storage devices 108. As an example, the security level 132 may correspond with a FIPS security level. In this example, a security level 132 of four may correspond with a FIPS level of four (e.g. FIS 140-4), a security level 132 of three may correspond with a FIPS level of three (e.g. FIS 140-3), a security level 132 of two may correspond with a FIPS level of two (e.g. FIS 140-2), and a security level 132 of one may correspond with a FIPS level of one (e.g. FIS 140-1).

In some examples, the information security engine 110 may determine the security level 132 for the target data storage device 108 based at least in part on the physical location of the target data storage device 108. In this example, the information security engine 110 may determine a physical location where the target data storage device 108 is located based on location information (e.g. an address or GPS coordinates) stored in the data storage device information 114. The information security engine 110 may then determine a security level 132 based on the location of the target data storage device 108. In this example, different locations may be associated with different security levels 132. For instance, low-risk locations may be associated with a higher security level 132 and high-risk locations may be associated with a lower security level 132.

As another example, the information security engine 110 may associate the target data storage device 108 with a higher security level 132 when the target data storage device 108 is located within a secure facility. In this example, the information security engine 110 considers the security features associated with the location of the target data storage device 108 as well as the security features of the target data storage device 108. Examples of security features for a facility include, but are not limited to, access control to the target data storage device, alarm systems installed at a facility, security personnel at a facility, or any other suitable type of security features provided by a facility where the target data storage device 108 is located.

In some examples, the information security engine 110 may determine the security level 132 for the target data storage device 108 based at least in part on the authentication protocols that are used by the target data storage device 108. Examples of authentication protocols include, but are not limited to, role-based authentication and identity-based authentication. For instance, identity-based authentication protocols may be associated with a higher security level 132 and role-based authentication protocols may be associated with a lower security level 132.

In some examples, the information security engine 110 may determine the security level 132 for the target data storage device 108 based at least in part on the encryption protocols that are used by the target data storage device 108. In this case, the information security engine 110 may associate more secure encryption techniques with higher security levels 132. For instance, the security level 132 may be proportional to the number of bits that are used for encryption. In other words, encryption techniques that use a large number of bits are associated with a higher security level 132.

In some examples, the information security engine 110 may determine the security level 132 for the target data storage device 108 based at least in part on a tamper protection type or level that is used by the target data storage device 108. Examples of types of tamper protection include, but are not limited to, physical tamper-evidence generation, physical tamper resistance, physical or logical separations between interfaces, self-destructing tamper protection, or any other suitable type of tamper protection. In this case, the information security engine 110 associates more secure tamper protection techniques with a higher security level 132. For instance, self-destructing tamper protection may be associated with a higher security level 132 than physical tamper resistance.

In other examples, the information security engine 110 may determine the security level 132 for the target data storage device 108 based on any other suitable type or combination of security features that are associated with the target data storage device 108.

At step 208, the information security engine 110 determines vulnerability types 134 that are associated with the target data storage device 108 based on its determined security level 132. In one embodiment, the information security engine 110 uses the vulnerability map 118 to identify vulnerability types 134 based on the determined security level 132. For instance, the information security engine 110 may use the vulnerability map 118 to identify one or more vulnerability types 134 that are mapped to the security level 132 of the target data storage device 108. Here, the information security engine 110 uses the vulnerability map 118 to determine what types of attacks the target data storage device 108 is susceptible to based on its security level 132.

At step 210, the information security engine 110 identifies security controls 142 for the target data storage device 108 based on the determined vulnerability types 134. After determining the vulnerability types 134 the target data storage device 108 is most susceptible to, the information security engine 110 may then use the security control information 116 to identify one or more security controls 142 that can be applied to the target data storage device 108 to increase the information security of the target data storage device 108. For example, the information security engine 110 may use the identified vulnerability types 134 as a search token with the security control information 116 to identify security controls 142 that are able to mitigate the effects of the identified vulnerability types 134. The information security engine 110 may select one or more of the identified security controls 142 to apply to the target data storage device 108. For instance, the information security engine 110 may select a security control 142 that comprises an authentication protocol for the target data storage device 108, an encryption protocol for storing the data element 122, or any other suitable type of security control 142.

In one embodiment, the information security engine 110 is configured to output the one or more identified security controls 142 to a user for review and/or approval. For example, the information security engine 110 may send information identifying the one or more security controls 142 back to the network device 104 that sent the data storage request 120. In response to sending the information to the network device 104, the information security engine 110 may receive a user input that indicates an approval for one or more security controls 142. For example, the user input may identify one or more security controls 142 that the user would like to apply to the target data storage device 108 before storing the data element 122 in the target data storage device 108.

At step 212, the information security engine 110 applies the identified security controls 142 to the target data storage device 108. Here, the information security engine 110 uses the security control information 116 to identify the software and/or hardware configurations that are associated with the identified security controls 142. The information security engine 110 may then apply the identified software and/or hardware configurations to the target data storage device 108. The information security engine 110 may implement port configurations, network configurations, authentication protocol instructions, encryption protocol instructions, tamper protection instructions, or any other suitable type of software or hardware settings for the target data storage device 108.

At step 214, the information security engine 110 stores the data element 122 in the target data storage 108 device after applying the identified security controls 142. For example, the information security engine 110 may receive the data element 122 from the network device 104 and then store the received data element 122 in the target data storage device 108 after applying the identified security controls 142.

Secure Data Storing Process Based on a Vulnerability Level

Figure 3:
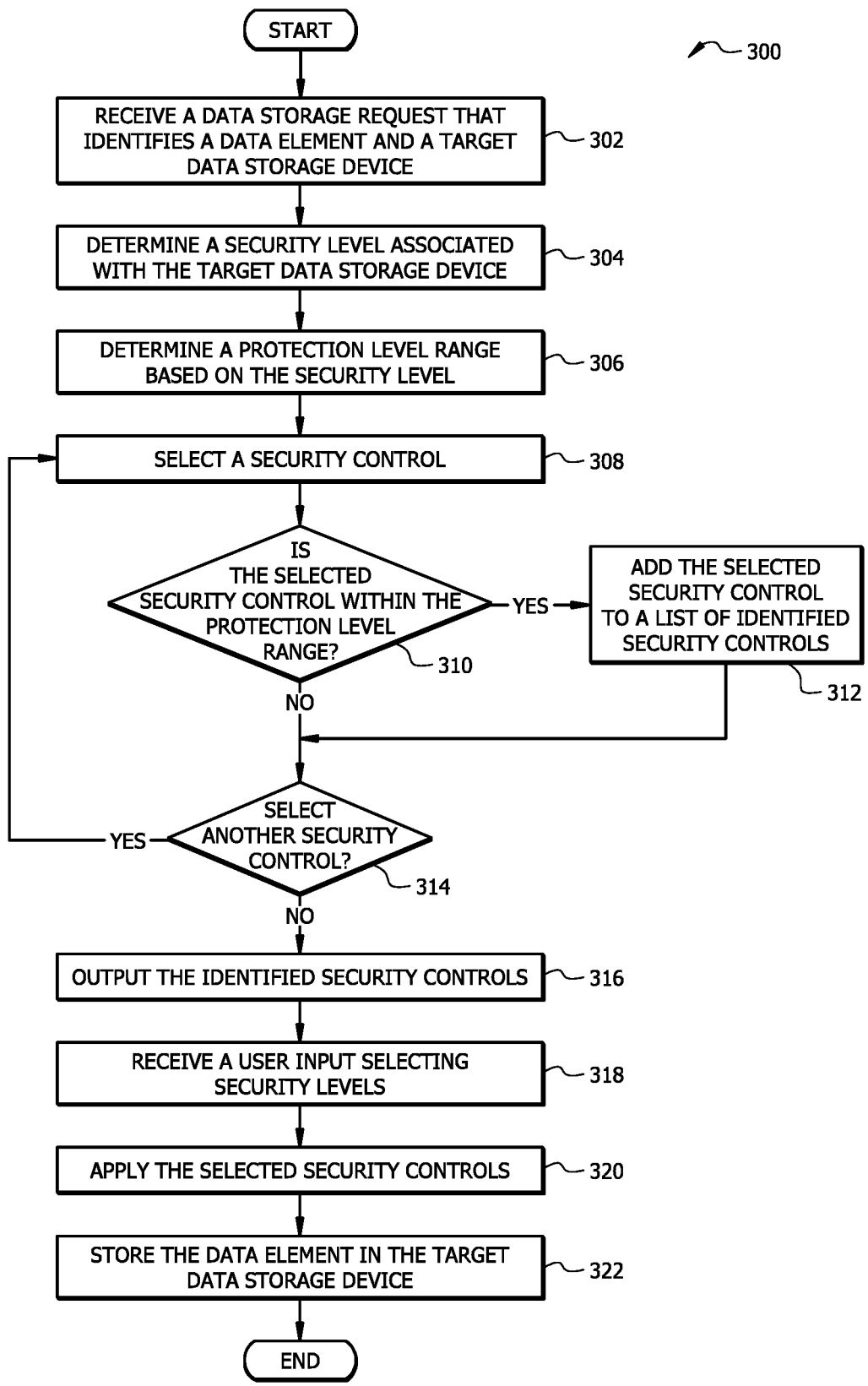
FIG. 3 is a flowchart of an embodiment of data storing method based on vulnerability levels.

FIG. 3 is a flowchart of an embodiment of a data storing method 300 based on a vulnerability level of a target data storage device 108. The information security device 106 may employ method 300 to determine how vulnerable a target data storage device 108 is to attacks and to apply one or more security controls 142 to increase the information security level of the target data storage device 108.

At step 302, the information security engine 110 receives a data storage request 120 for storing a data element 122 that identifies a target data storage device 108. For example, the data storage request 120 may comprise context information 124 that comprises a data storage device identifier 126 for a target data storage device 108.

At step 304, the information security engine 110 determines a security level 132 that is associated with the target data storage device 108 based on security features associated with the target data storage device 108. The determined security level 132 is proportional to the number and/or the robustness of the security features provided by the target data storage device 108. The information security engine 110 may determine a security level 132 for the target data storage device 108 using a process similar to the process described in step 206 of FIG. 2.

At step 306, the information security engine 110 determines a protection level range 144 based on the determined security level 132. The protection level range 144 comprises a maximum protection level 136 for a security control 142 and a minimum protection level 136 for a security control 142. In one embodiment, the minimum protection level 136 may be a value that is proportional to the determined security level 132. For example, a security level 132 of one may correspond with a protection level 136 of twenty-five, a security level 132 of two may correspond with a protection level 136 of fifty, a security level 132 of three may correspond with a protection level 136 of seventy-five, and a security level 132 of four may correspond with a protection level 136 of one-hundred. In other examples, the information security engine 110 may determine the minimum protection level 136 using any other suitable mapping or technique.

In one example, the maximum protection level 136 may be automatically set to the highest possible protection level 136 value. In this case, the information security engine 110 is able to consider any security controls 142 with protection level 136 that is above the minimum protection level 136. In another example, the maximum protection level 136 may be set to a predetermined amount away from the minimum protection level 136. For instance, the maximum protection level 136 may be configured to be twenty-five units away from the minimum protection level 136. In other examples, the maximum protection level 136 may be configured to be any other suitable number of units away from the minimum protection level 136.

In another example, the maximum protection level 136 may be determined based on the physical location of the target data storage device 108. For instance, the information security engine 110 may determine a physical location where the target data storage device 108 is located based on location information (e.g. an address or GPS coordinates) stored in the data storage device information 114. The information security engine 110 may then determine whether the identified location has any protection level 136 requirements or restrictions. For example, the information security engine 110 may determine that the location where the target data storage device 108 is located allows up to the highest possible protection level 136 for security controls 142. In this case, the information security engine 110 may select the highest possible protection level 136 as the maximum protection level 136. As another example, the information security engine 110 may determine that the location where the target data storage device 108 is located restricts certain protection levels 136. In this case, the information security engine 110 may select a protection level 136 that is within the allowed protection levels 136 as the maximum protection level 136. In some cases, the maximum protection level 136 is set to a value that is less than the highest protection level 136. A high protection level 136 may limit the ability for an authorized third-party to access data within a data storage device 108 which may be prohibited in some regions.

At step 308, the information security engine 110 selects a security control 142 from the security control information 116. Here, the information security engine 110 iteratively selects security controls 142 from the security control information 116 to determine whether the selected security control 142 would improve the information security level of the target data storage device 108.

At step 310, the information security engine 110 determines whether the selected security control 142 is within the protection level range 144. The information security engine 110 uses the security control information 116 to determine a protection level 136 that is associated with the selected security control 142. The information security engine 110 then compares the protection level 136 of the security control 142 to the minimum protection level 136 and the maximum protection level 136 to determine whether the selected security control 142 is within the minimum protection level 136 and the maximum protection level 136. The information security engine 110 determines that the selected security control 142 is within the protection level range 144 when the protection level 136 of the security control 142 is within the minimum protection level 136 and the maximum protection level 136. The information security engine 110 proceeds to step 312 in response to determining that the selected security control 142 is within the protection level range 144.

At step 312, the information security engine 110 adds the selected security control 142 to a list of identified security controls 142. Here, the information security engine 110 aggregates a list of selected security controls 142 that are within the minimum protection level 136 and the maximum protection level 136. The list of identified security controls 142 acts as a candidate list for security controls 142 that can be applied to the target data storage device 108 to improve the information security level of the target data storage device 108.

Returning to step 310, the information security engine 110 proceeds to step 314 in response to determining that the selected security control 142 is not within the protection level range 144. At step 314, the information security engine 110 determines whether to select another security control 142. For example, the information security engine 110 may be configured to analyze all of the security controls 142 in the security control information 116 to identify security control 142 candidates. As another example, the information security control engine 110 may be configured to stop selecting additional security controls 142 after identifying a predetermined number of security controls 142. The information security engine 110 returns to step 308 in response to determining to select another security control 142. Otherwise, the information security engine 110 proceeds to step 316 in response to determining not to select another security control 142.

At step 316, the information security engine 110 outputs the one or more security controls 142. For example, the information security engine 110 may send information identifying the one or more security controls 142 back to the network device 104 that sent the data storage request 120.

At step 318, the information security engine 110 receives a user input that selects one or more security controls 142 in response to sending the information to the network device 104. The user input may indicate an approval for one or more security controls 142. For example, the user input may identify one or more security controls 142 that the user would like to apply to the target data storage device 108.

At step 320, the information security engine 110 applies the selected security controls 142 to the target data storage device 108. Here, the information security engine 110 identifies the software and/or hardware configurations in the security control information 116 that are associated with the identified security controls 142 the information security engine 110 may then apply the identified configurations to the target data storage device 108. For example, the information security engine 110 may implement port configurations, network configurations, authentication protocol instructions, encryption protocol instructions, tamper protection instructions, or any other suitable type of software or hardware settings for the target data storage device 108.

At step 322, the information security engine 110 stores the data element 122 in the target data storage device 108 after applying the selected security controls 142. For example, the information security engine 110 may receive the data element 122 from the network device 104 and then store the received data element 122 in the target data storage device 108 after applying the identified security controls 142.

Network Device Hardware Configuration

Figure 4:
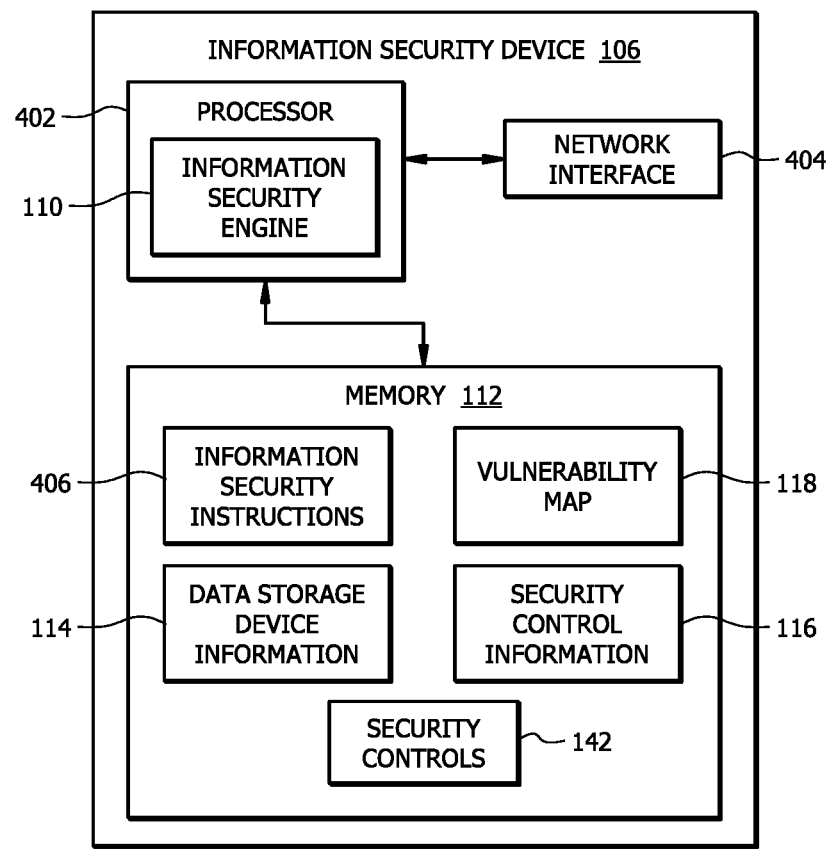
FIG. 4 is a schematic diagram of an embodiment of a device configured to securely store data.

FIG. 4 is a schematic diagram of an embodiment of a device (e.g. information security device 106) configured to securely store data. The information security device 106 comprises a processor 402, a memory 112, and a network interface 404. The information security device 106 may be configured as shown or in any other suitable configuration.

The processor 402 comprises one or more processors operably coupled to the memory 112. The processor 402 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 402 may be a programmable logic device, a microcontroller, a microprocessor, or any suitable combination of the preceding. The processor 402 is communicatively coupled to and in signal communication with the memory 112. The one or more processors are configured to process data and may be implemented in hardware or software. For example, the processor 402 may be 8-bit, 16-bit, 32-bit, 64-bit or of any other suitable architecture. The processor 402 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions to implement an information security engine 110. In this way, processor 402 may be a special-purpose computer designed to implement the functions disclosed herein. In an embodiment, the information security engine 110 is implemented using logic units, FPGAs, ASICs, DSPs, or any other suitable hardware. The information security engine 110 is configured to operate as described in FIGS. 1, 2, and 3. For example, the information security engine 110 may be configured to perform the steps of method 200 and 300 as described in FIGS. 2 and 3, respectively.

The memory 112 comprises one or more disks, tape drives, or solid-state drives, and may be used as an over-flow data storage device, to store programs when such programs are selected for execution, and to store instructions and data that are read during program execution. The memory 112 may be volatile or non-volatile and may comprise a read-only memory (ROM), random-access memory (RAM), ternary content-addressable memory (TCAM), dynamic random-access memory (DRAM), and static random-access memory (SRAM).

The memory 112 is operable to store information security instructions 406, data storage device information 114, security control information 116, vulnerability maps 118, security controls 142, and/or any other data or instructions. The information security instructions 406 may comprise any suitable set of instructions, logic, rules, or code operable to execute the information security engine 110. The data storage device information 114, the security control information 116, the vulnerability map 118, and security controls 142 are configured similar to the authorized data storage device information 114, the security control information 116, the vulnerability map 118, and security controls 142 described in FIGS. 1-3, respectively.

The network interface 404 is configured to enable wired and/or wireless communications. The network interface 404 is configured to communicate data between the information security device 106 and other devices (e.g. network devices 104), systems, or domain. For example, the network interface 404 may comprise a WIFI interface, a LAN interface, a WAN interface, a modem, a switch, or a router. The processor 402 is configured to send and receive data using the network interface 404. The network interface 404 may be configured to use any suitable type of communication protocol as would be appreciated by one of ordinary skill in the art.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. An information security device, comprising:
a memory operable to store security control information comprising a plurality of security controls, wherein:
each security control is associated with a protection level for data security; and
each security control comprises a hardware configuration for data storage devices; and
a processor operably coupled to the memory, configured to:
receive a data storage request comprising context information associated with storing a data element, wherein the context information identifies a target data storage device;
determine a security level associated with the target data storage device, wherein the security level is based on security features associated with the target data storage device;
determine a protection level range based on the determined security level, wherein the protection level range comprises:
a maximum protection level; and
a minimum protection level;
identify one or more security controls within the protection level range; and
output the identified one or more security controls;
wherein determining the maximum protection level comprises:
determining a physical location of the target data storage device;
selecting a maximum protection level value based on the physical location of the target storage device; and
determining the maximum protection level is less than a highest protection level associated with the plurality of security controls.

2. The device of claim 1, wherein the processor is further configured to:
receive the data element;
receive a user input identifying a selected security control from among the identified one or more security controls;
apply the selected security control to the target data storage device; and
store the data element in the target data storage device after applying the selected security controls.

3. The device of claim 1, wherein determining the security level associated with the target data storage device is based at least in part on authentication protocols used by the target data storage device.

4. The device of claim 1, wherein determining the security level associated with the target data storage device is based at least in part on a tamper protection level for the target data storage device.

5. The device of claim 1, wherein determining the security level associated with the target data storage device is based at least in part on encryption protocols used by the target data storage device.

6. An information security method, comprising:
receiving a data storage request comprising context information associated with storing a data element, wherein the context information identifies a target data storage device;
determining a security level associated with the target data storage device, wherein the security level is based on security features associated with the target data storage device;
determining a protection level range based on the determined security level, wherein the protection level range comprises:
a maximum protection level; and
a minimum protection level;
identifying one or more security controls within the protection level range, wherein:
each security control is associated with a protection level for data security; and
each security control comprises a hardware configuration for data storage devices; and
outputting the identified one or more security controls;
wherein determining the maximum protection level comprises:
determining a physical location of the target data storage device;
selecting a maximum protection level value based on the physical location of the target storage device; and
determining the maximum protection level is less than a highest protection level associated with the plurality of security controls.

7. The method of claim 6, further comprising:
receiving the data element;
receiving a user input identifying a selected security control from among the identified one or more security controls;
applying the selected security control to the target data storage device; and
storing the data element in the target data storage device after applying the selected security controls.

8. The method of claim 6, wherein determining the security level associated with the target data storage device is based at least in part on authentication protocols used by the target data storage device.

9. The method of claim 6, wherein determining the security level associated with the target data storage device is based at least in part on a tamper protection level for the target data storage device.

10. The method of claim 6, wherein determining the security level associated with the target data storage device is based at least in part on encryption protocols used by the target data storage device.

11. A computer program comprising executable instructions stored in a non-transitory computer readable medium that when executed by a processor causes the processor to:
receive a data storage request comprising context information associated with storing a data element, wherein the context information identifies a target data storage device;
determine a security level associated with the target data storage device, wherein the security level is based on security features associated with the target data storage device;
determine a protection level range based on the determined security level, wherein the protection level range comprises:
a maximum protection level; and
a minimum protection level;
identify one or more security controls within the protection level range, wherein:
each security control is associated with a protection level for data security; and each security control comprises a hardware configuration for data storage devices; and output the identified one or more security controls;

wherein determining the maximum protection level comprises:

determining a physical location of the target data storage device;

selecting a maximum protection level value based on the physical location of the target storage device; and determining the maximum protection level is less than a highest protection level associated with the plurality of security controls.

12. The computer program of claim 11, further comprising instructions that when executed by the processor causes the processor to:

receive the data element;

receive a user input identifying a selected security control from among the identified one or more security controls;

apply the selected security control to the target data storage device; and store the data element in the target data storage device after applying the selected security controls.

13. The computer program of claim 11, wherein determining the security level associated with the target data storage device is based at least in part on authentication protocols used by the target data storage device.

14. The computer program of claim 11, wherein determining the security level associated with the target data storage device is based at least in part on a tamper protection level for the target data storage device.

* * * * *